United States Patent
Pilutti et al.

[19]

[11] Patent Number: 6,021,367
[45] Date of Patent: Feb. 1, 2000

[54] VEHICLE STEERING SYSTEM AND METHOD FOR CONTROLLING VEHICLE DIRECTION THROUGH DIFFERENTIAL BRAKING OF LEFT AND RIGHT ROAD WHEELS

[75] Inventors: Thomas Edward Pilutti, Ann Arbor; Davorin David Hrovat, Dearborn; Ali Galip Ulsoy, Ann Arbor, all of Mich.

[73] Assignee: Ford Global Technologies, Inc., Dearborn, Mich.

[21] Appl. No.: 08/295,194

[22] Filed: Aug. 24, 1994

[51] Int. Cl.[7] ........................................ B60T 8/64
[52] U.S. Cl. ................ 701/41; 701/70; 180/411; 303/146
[58] Field of Search ................ 364/426.01, 426.02, 364/424.05, 447, 559, 561; 303/93, 97, 100, 99, 104, 107, 146; 180/197, 79.1, 141, 142, 153, 411; 701/70, 71, 41

[56] References Cited

U.S. PATENT DOCUMENTS

| | | | |
|---|---|---|---|
| 3,894,773 | 7/1975 | Cleveland et al. | 303/21 A |
| 4,401,181 | 8/1983 | Schwarz | 180/168 |
| 4,482,961 | 11/1984 | Kilner et al. | 364/428 |
| 4,809,181 | 2/1989 | Ito et al. | 364/426.01 |
| 4,852,009 | 7/1989 | Jonner et al. | 364/426.02 |
| 4,998,593 | 3/1991 | Karnopp et al. | 180/140 |
| 5,134,352 | 7/1992 | Matsumoto et al. | 318/587 |
| 5,172,961 | 12/1992 | Inoue et al. | 303/100 |
| 5,206,808 | 4/1993 | Inoue et al. | 364/424.05 |
| 5,211,453 | 5/1993 | Van Zanten et al. | 303/111 |
| 5,228,757 | 7/1993 | Ito et al. | 303/100 |
| 5,229,944 | 7/1993 | Yasuno | 364/426.01 |
| 5,245,422 | 9/1993 | Borcherts et al. | 364/424.02 |
| 5,251,137 | 10/1993 | Chin et al. | 364/426.02 |
| 5,255,194 | 10/1993 | Schaufelberger et al. | 364/426.02 |
| 5,267,783 | 12/1993 | Inoue et al. | 303/111 |
| 5,318,143 | 6/1994 | Parker et al. | 180/168 |
| 5,388,658 | 2/1995 | Ando et al. | 180/197 |
| 5,390,118 | 2/1995 | Margolis et al. | 364/424.02 |

OTHER PUBLICATIONS

SAE Paper No. 920645, "Improvement of Vehicle Dynamics Through Braking Force Distribution Control", Matsumoto et al, 1992, pp. 83–91.

Lubin et al., "Lateral Control of an Autonomous Road Vehicle in a Simulated Highway Environment Using Adaptive Resonance Neural Network", Intelligence Vehicle, 1992.

Hattori et al., "Driving Control System for an Autonomous Vehicle Using Multiple Observed Point Information", IEEE 1992, pp. 207–212.

Suzuki et al., "Lane Recognition System for Guiding of Autonomous Vehicle", Intelligence Vehicle, 1990.

*Primary Examiner*—Tan Nguyen
*Attorney, Agent, or Firm*—Gregory P. Brown; Roger L. May

[57] ABSTRACT

A vehicle steering system in which brake steering forces intervene in the manual steering function wherein brake steering can be used to control the lateral position of a vehicle to supplement manual steering efforts, the system including brake controls for wheel brakes at the left and right sides of the vehicle which develop differential brake forces that result in a change in vehicle lateral position, the lateral position that is developed forming an input for a feedback regulator and brake controller, the magnitude of lateral position errors determining the brake forces that affect yaw rate and lateral position.

3 Claims, 6 Drawing Sheets

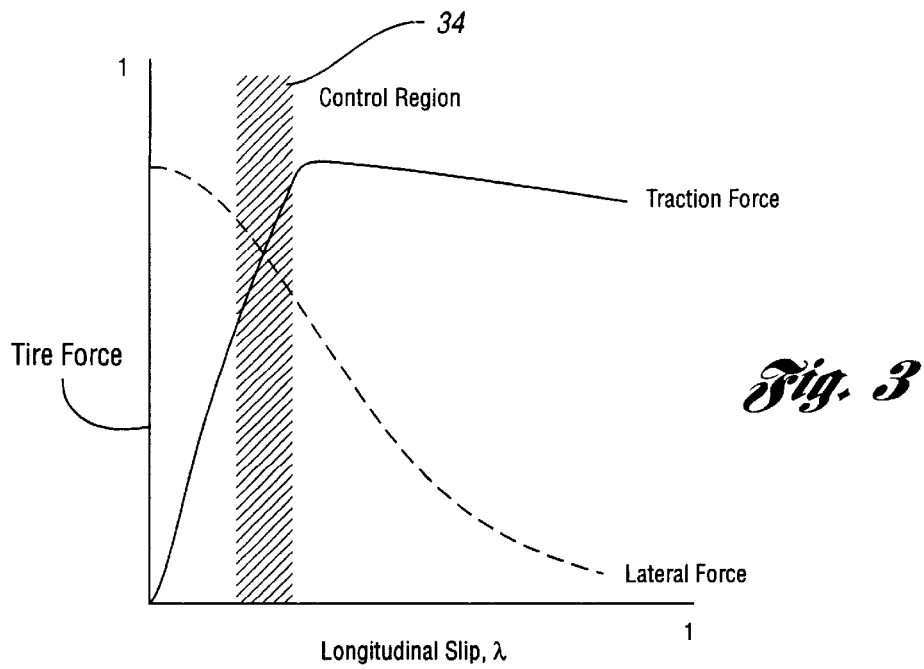
*Fig. 3*
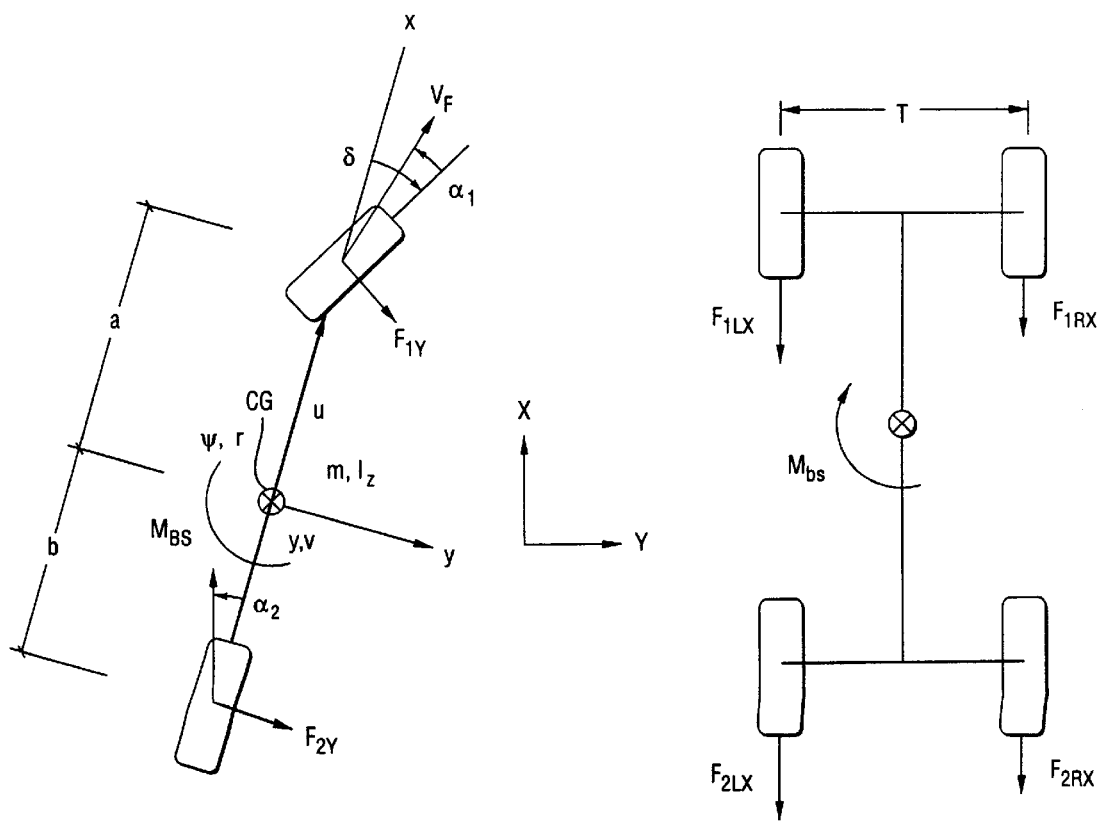
*Fig. 4*
*Fig. 5*

VEHICLE STEERING SYSTEM AND METHOD FOR CONTROLLING VEHICLE DIRECTION THROUGH DIFFERENTIAL BRAKING OF LEFT AND RIGHT ROAD WHEELS

TECHNICAL FIELD

The invention relates to vehicle controllers for advanced vehicle and highway systems with road departure avoidance capabilities.

BACKGROUND OF THE INVENTION

Our invention comprises improvements in known steering and braking systems for automotive vehicles wherein differential brake forces are applied to improve vehicle handling. In such systems, a turn can be achieved or altered by appropriately distributing brake pressure to the vehicle wheel brakes. The effective wheel braking forces at the left and right brakes determines direction of the turn and controls vehicle yaw, either simultaneously with driver controlled steering forces or independently of driver steering efforts.

Handling of the vehicle can be modified to produce a combined desired braking and cornering characteristic by varying the braking pressure at the wheels if either oversteering or understeering is detected. An understeering condition will result in an increase in the braking pressure of the front wheels. On the other hand, an oversteering condition will result in a decrease in the braking pressure of the rear wheels. These characteristics are described in U.S. Pat. No. 4,809,181.

The concept of controlling vehicle handling by varying wheel brake pressure has been extended to steering systems wherein the brake actuators are subjected to differential pressures in inside and outside wheel brake cylinders to develop a controlled yaw moment to promote turning maneuvers. This concept of using differential wheel brake pressures for steering purposes is described, for example, in U.S. Pat. No. 5,134,352.

U.S. Pat. No. 5,228,757 is a further example of a control system in which the steering behavior of the vehicle is controlled by differential wheel brake pressures, but it includes a sensor for detecting vehicle yaw rate as an operating variable for achieving a control signal that complements the driver steering command. The sensed vehicle yaw rate is compared to an estimated vehicle yaw rate based upon driver input. The controller determines the magnitude of any yaw rate error for purposes of developing a control signal that reduces the error. A decrease in yaw moment in the direction of the turn can be obtained by altering the left to right brake pressure distribution so that the brakes on the inside of the turn have less braking force than those on the outside. In effect, the controller establishes a correction to the desired yaw rate that is commanded by the driver steering wheel input. Corrections are made to the brake force distribution until a yaw rate reference value is achieved. Thus, during a combined hard braking in the steering maneuver, a braking yaw moment on the vehicle is imposed, thereby supplementing the control of the vehicle by the operator during hard braking.

In the prior art system of the '757 patent, a target yaw rate is computed based on steering wheel angle and vehicle speed. A yaw rate feedback is performed to modulate the distribution of braking pressure to the wheel cylinders.

The yaw moment is controlled directly in this prior art system by controlling the left to right pressure distribution, aside from the front and rear brake pressure distribution, during cornering.

BRIEF DESCRIPTION OF THE INVENTION

The improved brake steering system of our invention uses differential braking as a means to perform limited steering functions through vehicle steering intervention that is independent of braking maneuvers imposed on the vehicle by the operator. A limited degree of vehicle steering capability is achievable to provide enhanced vehicle handling.

During the functioning of our improved steering system, the driver remains in control of the vehicle during steering maneuvers. Our improved braking system is merely an intervention that is imposed automatically during control of the vehicle by the operator. The driver continues to provide the primary steering commands, but the automatic brake system intervenes to provide an additional assist in the lateral control effort.

The presence of the driver in the steering control loop is in contrast to prior art teachings that achieve steering functions without feedback to the driver with respect to system augmented steering effects. Such automatic steering augmentation systems, of necessity, are more complex and expensive forms of vehicle steering systems compared to our improved system where intervention merely provides an additive lateral control effort to complement the driver's primary steering commands.

The system of our invention strives to control the difference between lateral lane position The brake steering that induces a yaw moment when our improved system is actuated will serve to decelerate the vehicle. This deceleration is sensed by the vehicle operator. This is a desirable side effect of an effort to control the lateral position of the vehicle through brake steering. The driver immediately senses that the controller has been triggered. The driver then is motivated to eliminate the condition that caused the error in the lateral position of the vehicle.

Our improved system does not require substantive hardware modifications to conventional brake systems with anti-lock capabilities (ABS). Neither does it require changes in conventional vehicle steering systems.

BRIEF DESCRIPTION OF THE DRAWINGS

FIG. 3 shows the relationship between lateral force and traction force in a plot of tire force versus longitudinal slip of the tires for the control region for the brake control circuit of FIG. 1;

FIG. 4 shows a bicycle model indicating the brake steer moment imposed on a simplified vehicle model representation, where the external brake steer moment and the wheel braking forces are diagrammatically represented;

FIG. 5 shows the wheel brake force vectors for a four-wheel vehicle model as well as a brake steer moment that is created by the wheel brake forces during differential brake steering;

PARTICULAR DESCRIPTION OF THE INVENTION

Figure 1:
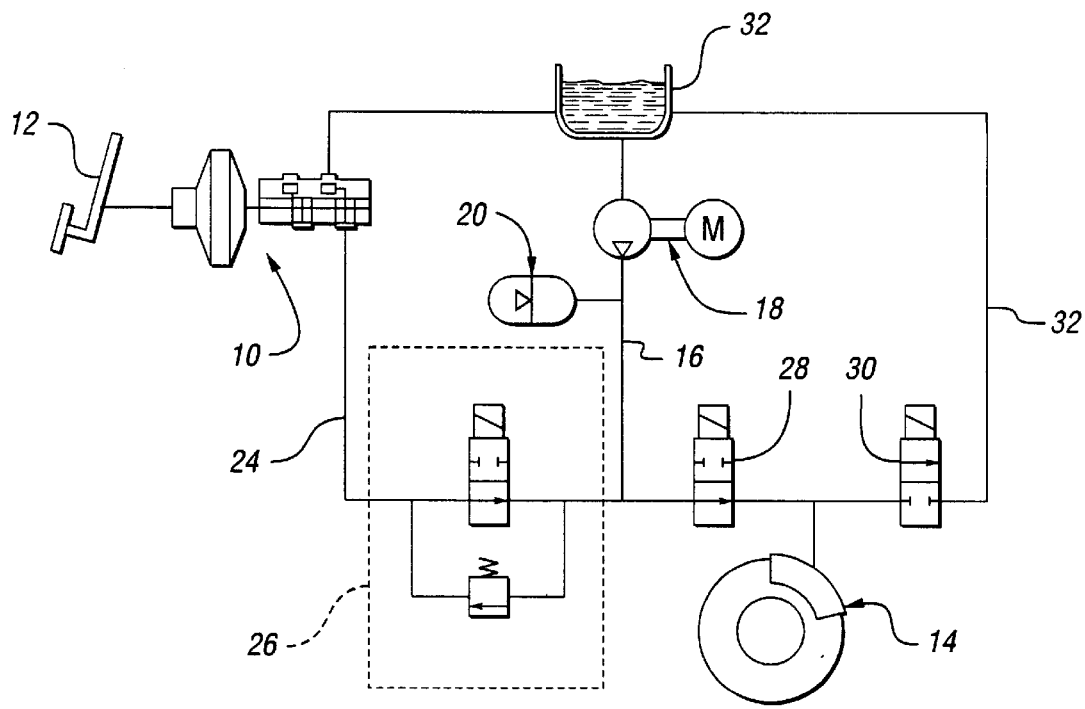
FIG. 1 shows a typical automatic brake system and traction control system known in the prior art for use with vehicle wheel brakes.

We have shown in FIG. 1 a typical brake system with automatic brake control and traction control features. This system includes a master brake cylinder and valve assembly 10 connected mechanically to the vehicle brake pedal 12. Wheel brakes 14 are supplied with working fluid from brake pressure delivery line 16 situated on the high pressure side of the pump-and-motor unit 18. The line 16 is in communication with the high pressure side of a brake pressure accumulator 20. The pump of the pump-and-motor unit 18 receives fluid from a brake fluid reservoir 22.

The brake master cylinder and valve assembly also communicates with the reservoir and is adapted to deliver braking pressure to the wheel brakes 14 through line 24. The traction control valve system 26 provides a pressure delivery path for the brake pressure at line 24 when the traction control system is in the inactive state shown in FIG. 1. An automatic brake system pressure supply valve 28 also defines in part the pressure supply line 24. When the automatic brake system supply valve 28 is inactive as shown in FIG. 1, pressure is distributed directly to the wheel brakes through the valve.

A wheel brake pressure vent valve 30 is in the pressure return passage 32 extending to the reservoir.

The elements illustrated in FIG. 1 make it possible to control wheel slip and wheel acceleration so as to maximize braking force while retaining lateral force generating ability. FIG. 3, for example, shows the relationship between the force on a tire and the longitudinal slip.

The circuit illustrated in FIG. 1 is capable of maintaining a lateral force and a traction force as a function of longitudinal slip that is within a pre-calibrated control region indicated in the shaded zone 34 of FIG. 3. Both the traction control function and the automatic brake function are obtained using the common circuit illustrated in FIG. 1. It is generally known in the art that traction control may employ engine torque control through spark timing, fuel supply or throttle intervention to limit output torque at the source in order to achieve a desired modulated traction at the wheels.

The improvements of our invention may be applied to a system of the kind shown in FIG. 1 since such a system, if it incorporates our improvements, would be capable of carrying out commanded control functions of a controller, to be described, to achieve differential brake pressures. The automatic brake control solenoid valves 28 and 30 can be controlled to achieve the required differential pressure at the wheels to effect automatic brake steering.

Figure 2:
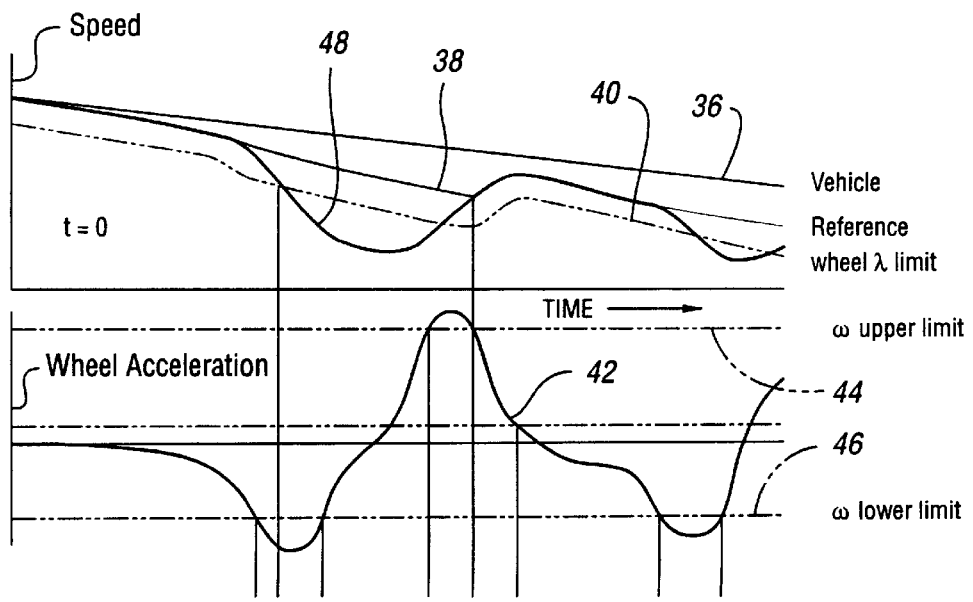
FIG. 2 shows a typical braking response to the operation of the control circuit of FIG. 1.

FIG. 2 shows a typical braking response to the operation of the automatic brake system of FIG. 1 during a braking cycle. Vehicle speed, as indicated at 36, decreases following initiation of braking at time t=0. The reference pressure established by the automatic brake system is shown at 38. This value is slightly greater than the wheel slip limit value shown at 40.

Corresponding wheel acceleration during the braking mode is shown at 42. The wheel acceleration will rise and fall within the upper and lower limits 44 and 46 in response to changes in the reference value. The corresponding wheel speed is shown at 48.

The brake steering system of our invention relies on the saturation effect of the circuit shown in FIG. 1. The automatic brake control elements will respond to a commanded brake pressure supplied by the brake steer feature in the same manner as it would respond to brake pressure applied by the driver pedal.

Our invention provides an ability of the circuit of FIG. 1 to respond to an additional pressure command supplied by the automatic brake steering feature during driving with non-slip conditions as the vehicle is forced to follow a controlled trajectory.

A simple linear model of our brake steering system is shown in FIGS. 4 and 5. As indicated in FIG. 5, a brake steering moment $M_{bs}$ is developed as differential longitudinal braking forces are applied to the wheel brakes. In the example of FIG. 5, the left wheel brakes, front and rear, develop braking forces $F_{1LX}$ and $F_{2LX}$. Each of these forces is larger than the corresponding braking forces on the right side of the vehicle, as shown at $F_{1RX}$ and $F_{2RX}$. The distance between the tires, or track, is designated by the symbol "T".

The longitudinal braking forces illustrated in FIG. 5 achieve differential braking. A two-wheel model or bicycle model of the vehicle is shown in FIG. 4 where the moment $M_{BS}$ is indicated to be a turning moment about the center of gravity CG of the vehicle. The moment $M_{BS}$ produces a yaw rate designated as "r" which, in turn, affects the front and rear cornering forces $F_{1Y}$ and $F_{2Y}$ in FIG. 4.

The angle δ shown in FIG. 4 is the driver steering input. The lateral forces in the FIG. 4 model are generated by the side slip angles shown at $\alpha_1$ and $\alpha_2$. These lateral forces (i.e., $F_{1Y}$ and $F_{2Y}$) provide the acceleration that varies the lateral position of the vehicle. Tire forces in the longitudinal direction X are ignored for purposes of this analysis.

One of the input signals that the controller would require is sensor information that indicates the position of the vehicle relative to the edge of the road. Optionally, road curvature information could be used in addition to the relative lateral position information.

Relative lateral position data can be obtained by a lateral position sensor that relies, for example, on radar technology, or doppler effects, or optical signals. The selection of an appropriate sensor to obtain relative lateral position information would be a matter of design choice. Relative lateral position information is fed back to the controller for the brake steering control system, thereby enabling the controller to initiate brake commands so that brake steering is achievable, although the brake commands must operate within the saturation limits of the automatic brake system described with reference to FIG. 1.

Since the vehicle brake steering, of necessity, requires braking, vehicle speed is diminished in all instances in which the brake steering control system is in operation. Brake steering with our improved system is not intended to serve as a continuous steering device. Rather, it is used only on an infrequent basis and for short durations based on driver state impact at 81 and lateral position input at 84, such as when it is determined through steering wheel action in combination with lane sensor data, previously discussed, that brake steering is appropriate.

Figure 6A:
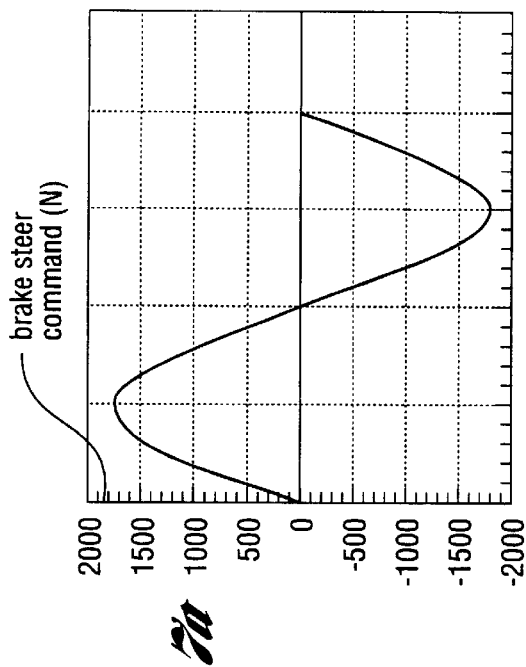
FIGS. 6a and 6b show a comparison between the wheel steering commands and the resulting lateral position deviation of the vehicle as the vehicle steering wheel position, during the steering maneuver, oscillates between positive and negative values about a zero value corresponding to straight-ahead driving.
Figure 6B:
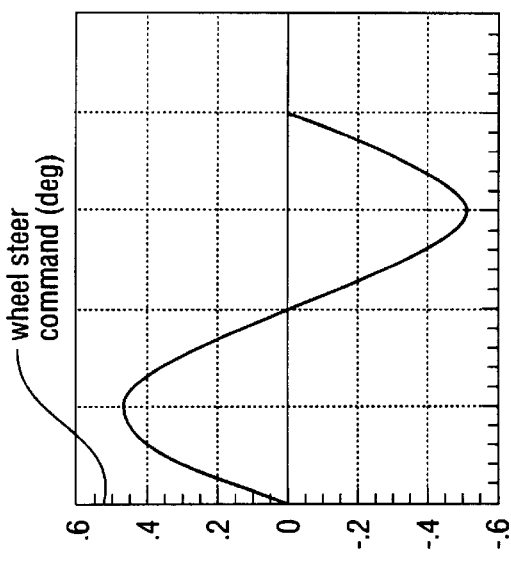

In FIG. 6, we have shown the steering characteristics indicating lateral deviation over time and the corresponding lateral deviation due to wheel steering commands. At time=0, the operator initiates a front wheel steering command beginning with 0 degrees. Steering angle at the front wheels rises to a value of about 0.4 degrees. The steering angle then is returned to 0 and enters a negative steering angle zone as the vehicle deviation pattern returns to normal as shown at the right side of FIG. 6. During the period of the steering maneuver from 0 seconds to 4 seconds, the vehicle will have followed a trajectory that results in a shifting of the forward motion approximately 3 meters from the direction of the vehicle at the start of the turning maneuver.

Figure 7A:
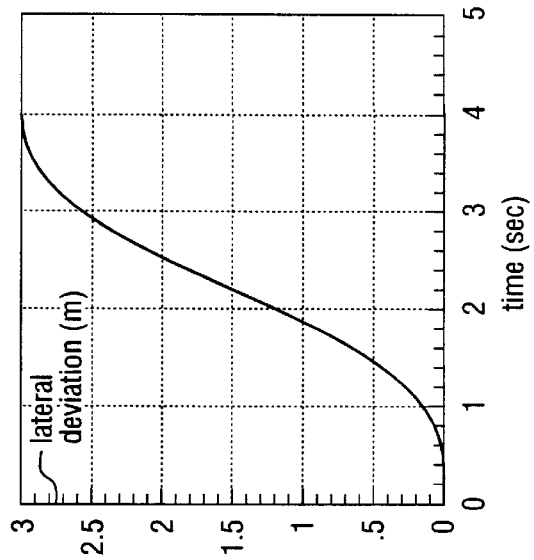
FIGS. 7a and 7b show the relationship between lateral position deviation of the vehicle during brake steering maneuvers as right and left wheel brake forces are subjected to differential pressures.
Figure 7B:
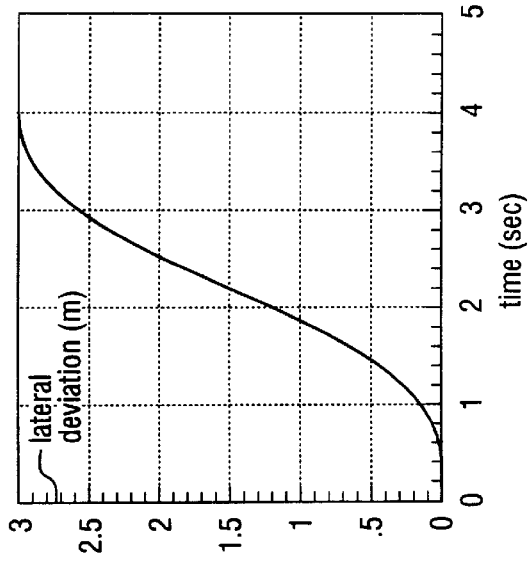

In FIG. 7, we have plotted a corresponding brake steering command that would lead to similar lateral deviation from the beginning to the end of a turning maneuver. It will be observed by comparing FIG. 7 with FIG. 6 that the steering characteristic of a brake steer event are generally the same as the corresponding characteristics of a driver-initiated steering event.

Figure 8A:
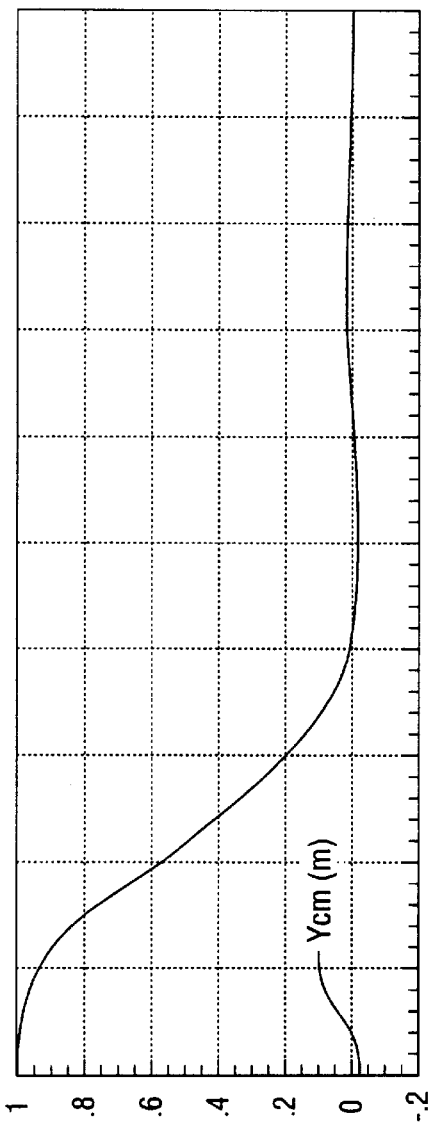
FIGS. 8a and 8b show a plot of the brake forces and the lateral position deviation of the vehicle during a simulated brake steering maneuver.
Figure 8B:
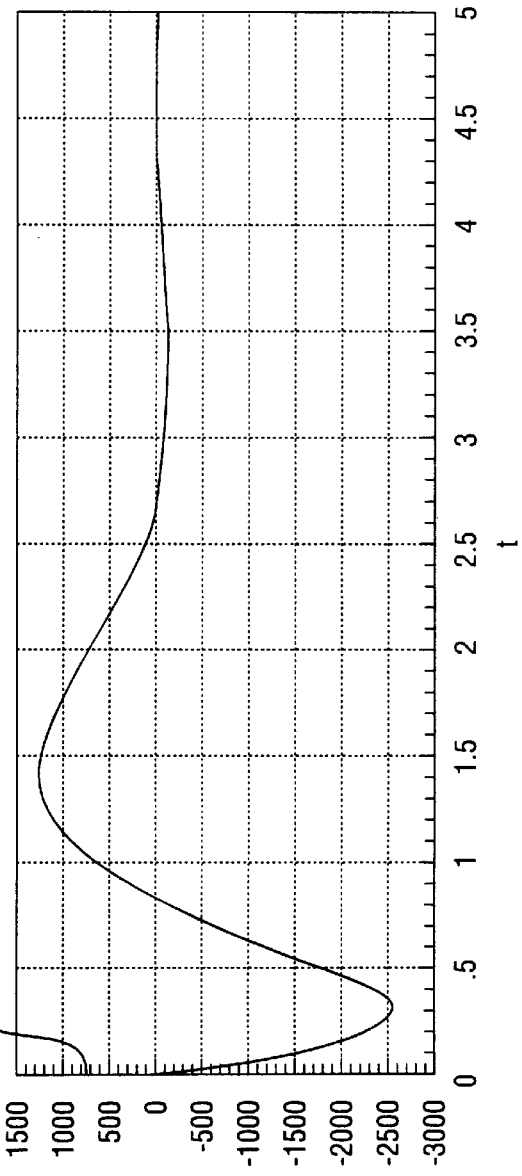

FIG. 8 shows a simulation of the response of the brake steering system to a 1 meter initial lateral deviation. Lateral deviation is designated in meters on the ordinate as $Y_{cm}$. The corresponding brake force (N) results from the lateral deviation provided by the brake steering event and is represented by the lower portion of the graph of FIG. 8 where the brake force is in a negative region. As the vehicle begins to recover, as indicated by the horizontal portion of the curve $Y_{cm}$, the brake force rises to a positive value and then becomes reduced to zero as the deviation is eliminated.

Figure 9A:
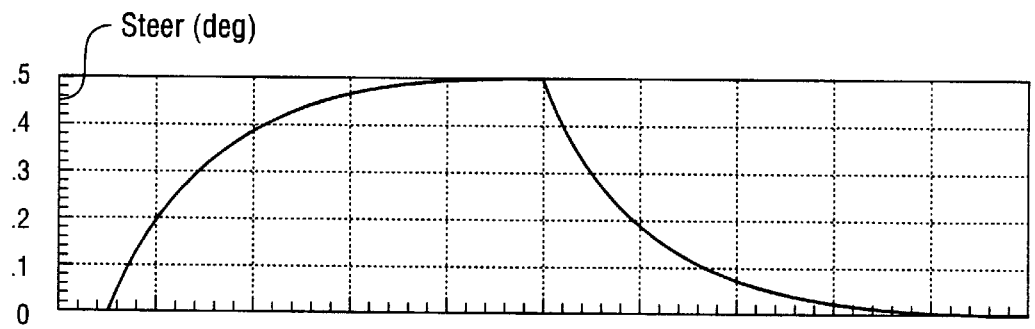
FIGS. 9a, 9b, and 9c show a plot similar to the plot of FIG. 8, but it shows a simulated response to a constant steering error at the steering wheel and the resulting brake forces that are generated to correct the steering error.
Figure 9B:
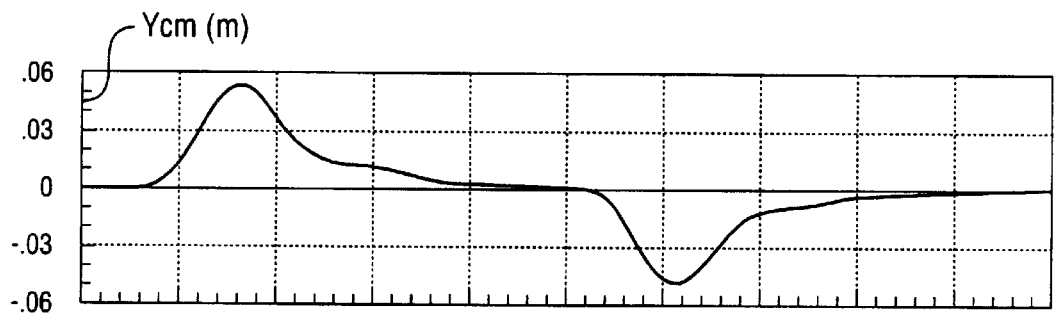
Figure 9C:
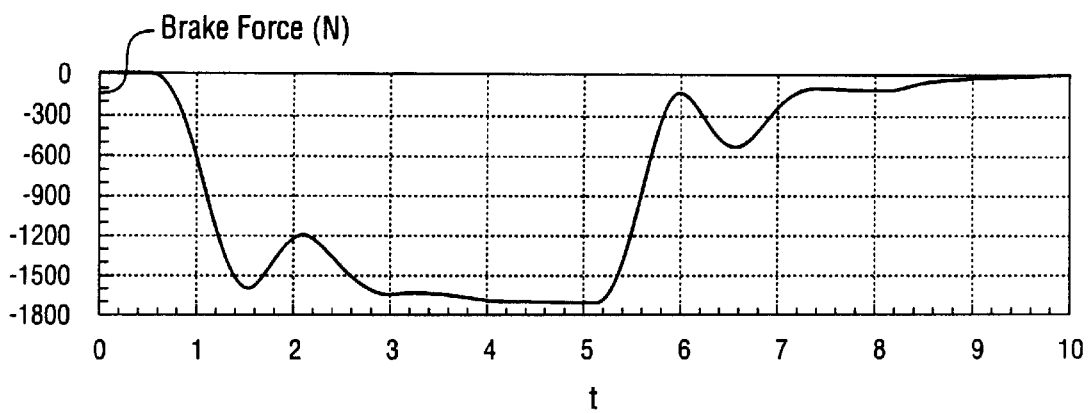

A simulated response to a constant steering error wherein the steering event is relatively continuous over an extended period is shown in FIG. 9. The brake forces, as seen in FIG. 9, will decrease between time=0 and time=5 seconds as the steering wheel position increases to its maximum angle. In the example of FIG. 9, the maximum steering wheel angle corresponds to a 0.5 degree constant steering error. In the portion of the steering event between 5 seconds and 10 seconds, the vehicle recovers until a 0 steering angle error is achieved. The lateral deviation $Y_{cm}$ and the brake steering forces behave as shown in FIG. 9 as the steering error is decreased until a steady state is achieved with zero tracking error after 10 seconds.

Brake steering moment $M_{bS}$ imposed on the linearized bicycle mode of FIG. 4 is implemented by adding the external moment $M_{BS}$ to the vehicle diagram of FIG. 4 and then summing the forces in the Y direction and the moments about the Z axis. The Z axis is the axis vertical to the plane of FIG. 4. It extends through the center of gravity CG.

The sum of the forces in the Y direction is expressed as:

$$\Sigma F_Y: m(\dot{v}+ru)=F_{1Y}+F_{2Y}$$

Likewise, the sum of the moments about the Z axis is expressed as:

$$\Sigma M_Z: I_z\dot{r}=aF_{1Y}-bF_{2Y}+M_{BS}$$

In the above equations:
m=vehicle mass (kg)
V=relative lateral velocity (m/s)
r=yaw rate (rad/s)
u=forward velocity (m/s)
$I_z$=yaw moment of inertia (kg-m$^2$)

$F_{1Y}$, $F_{2Y}$=respective front and rear lateral tire forces (N)
a,b=respective lengths from mass center to front and rear.

As indicated earlier, the forces in the X direction need not be considered in the computation of a lateral response if the forward speed, u, remains relatively constant.

The input brake steering moment $M_{BS}$ indicated in FIG. 4 is generated by different braking forces on the wheels on each side of the vehicle. The input moment $M_{BS}$ is formed by the braking differential in accordance with the equation:

$$M_{BS} = \frac{T}{2}(F_{RX} - F_{LX}) = \frac{T}{2}F_{BS},$$

where T equals vehicle tire spacing or track, and $F_{RX}$ and $F_{LX}$ are the respective right and left longitudinal tire forces. The lateral deviation rate of change or yaw rate r is produced by the moment $M_{BS}$. This yaw rate, in turn, affects the front and rear sideslip angles, $\alpha_1$ and $\alpha_2$, indicated in FIG. 4. The relationship between yaw rate and side slip angles is represented as:

$$\alpha_1 = \frac{v+ar}{u} - \delta \text{ and } \alpha_2 = \frac{v-br}{u}$$

The resulting lateral forces due to the yaw rate indicated above are determined by the front and rear sideslip angles and the tire cornering coefficients, $C_{a1}$ and $C_{a2}$. The lateral forces $F_{1Y}$ and $F_{2Y}$ shown in FIG. 5 can be represented as follows:

$$F_{1Y}=C_{a1}\alpha_1 \text{ and } F_{2Y}=C_{a2}\alpha_2$$

The lateral tire forces represented above are due to the lateral tire forces caused by brake steer input $M_{BS}$ as well as a normal steering input $\delta$. If there is no steering input $\delta$, the lateral forces generated by the sideslip angles provide the acceleration needed to vary the lateral position of the vehicle. Although the yaw moment $M_{BS}$ is not directly affected by the above equation for $F_Y$, the magnitude of the differential braking forces affects the sideslip angles due the presence of the yaw rate variable r in the above equations for sideslip angles.

Figure 10:
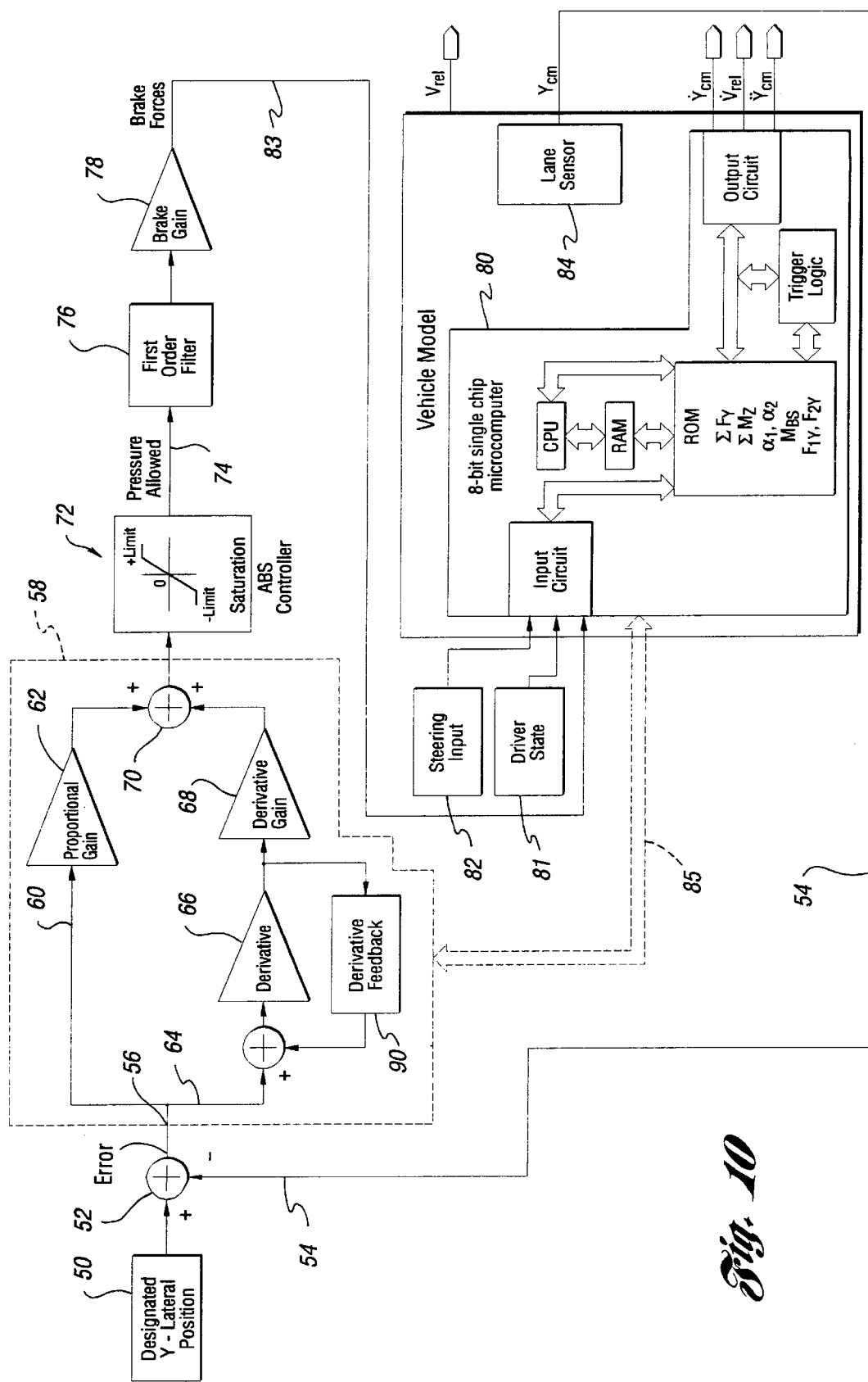
FIG. 10 shows a closed-loop diagram in functional block form indicating a brake steering system model with a proportional-derivative feedback path.

FIG. 10 shows in schematic form a closed loop circuit for the brake steering lateral error control of our invention. A desired lateral position Y is entered into the control loop as shown at 50. This input is received at a summing point 52 and is compared to lateral position sensor data from data flow path 54. An error is determined at 52 and is transferred to a function flow path 56. The error signal is delivered to PD controller 58, which has a proportional input portion at function flow segment 60.

A proportional gain factor is introduced at 62. A derivative portion of the error signal is transferred through function flow path 64 to derivative element 66, the output of which is augmented by a derivative gain as shown at 68. The output of the derivative gain and the proportional gain are summed at 70 and is used as an input to an automatic brake system controller 72. The output that is permitted in function flow path 74 by the automatic brake system controller 72 is determined by the saturation limits of the controller, as explained previously.

A first order filter at 76 develops a lag with a time constant of 0.1 seconds. The signal is multiplied by a gain factor, a scaler quantity, at 78 before the processed lateral displacement error is received by controller 80. The magnitude of the gain is based on the physical dimensions of the hydraulic system.

If the braking force that is dictated by the error at the input side of the PD controller 58 is not attainable due to road surface conditions and vertical tire loading, the automatic brake system will truncate the magnitude of the pressure made available to the brakes. The ideal brake force in that instance would have exceeded the saturation limits of the automatic brake system, and the controller would correct the brake pressure that otherwise would result in inaccurate or unachievable longitudinal brake forces at the tire.

If there is a steering input, that input can be represented by a driver initiated Y axis lateral deviation developed at action block 82, which is one of the inputs for the controller 80.

The lateral displacement developed by the controller is the output of a road lane sensor portion 84 of the controller 80. A lane sensor signal is distributed through function flow path 54 to the summing point 52, as indicated earlier.

Lateral velocity and lateral acceleration values are developed by the controller and received by output pins 86 and 88, respectively. These values can be used for other control functions not related to our invention.

The controller 80 is a sub-set of an overall vehicle model as indicated in FIG. 10. The controller 80 receives input data at its input circuit from the driver steering input action block 82 and from a driver state action block 81, as well as brake force input on data flow path 83 for the lateral position error circuit.

A trigger logic action block, which is part of the controller 80, will function as an "and" gate that will prevent a transfer of a brake steering command from the input circuit unless both a lateral position error and a predetermined driver state sensor signal occur simultaneously.

The controller 58 is a part of the controller 80, although it is shown in the schematic diagram of FIG. 10 isolated from controller 10. The control bus 85 transfers data between the controllers 58 and 80.

The CPU portion of the controller receives data from the input circuit and stores that information in RAM, from which it can be fetched for the purpose of performing the calculations called for by the control functions stored in ROM to produce an appropriate output for the output circuit. The calculation and the data retrieval occur in the usual fashion as the function storage registers in ROM and the data storage registers in RAM are addressed during each background pass of the controller.

The PD controller includes a proportional gain feature, as explained previously, to increase the system response and to reduce the magnitude of any steady state errors. The use of a proportional gain factor normally is not sufficient, however, to reduce steady state errors. Merely increasing the value for the gain factor in an attempt to increase the ability of the controller to reduce steady state errors may cause undesirable oscillations and a prolongation of the settling time. Therefore, a derivative gain feature of the PD controller 58 is added to complement the proportional gain feature in order to speed up the transient response of the control system. The derivative feature has a stabilizing affect on the control system by virtue of the addition of a phase lead to the control loop gain; i.e., it tends to reduce the phase lag of the gain. The usual feedback term for the derivative feature of the controller 58 is developed at action block 90.

Having described a preferred embodiment of our invention, what we claim and desire to secure by U.S. Letters Patent is:

We claim:

1. A differential braking system for an automotive vehicle for road use having road wheels including driver-controlled dirigible road-wheels and vehicle wheel brakes including driver-activated brake controls and means for controlling said dirigible wheels to effect a desired steering angle that results in a lateral position designated by the driver, the vehicle having a center of gravity between said wheel brakes and having means for detecting actual lateral position of said vehicle relative to said road;

means for computing braking forces at each of said wheels when said wheel brakes are activated and for determining the difference in said braking forces, means for computing a yaw moment as a function of said difference in said braking forces;

means for computing rate of change of yaw and for computing lateral vehicle acceleration required to effect lateral tire force to change actual lateral position of said vehicle including means for computing cornering tire forces on said dirigible wheels as a function of said rate of change of yaw; and means for comparing actual lateral position with said designated lateral position determined by said steering angle to create a lateral position error signal, and brake actuator means for activating said wheel brakes in response to said error signal independently of said driver-activated brake controls whereby differential braking forces are developed to effect steering intervention that complements driver steering of said driver controlled dirigible road wheels.

2. The system set forth in claim 1 wherein said vehicle has front and rear sets of road wheels, said front wheels being driver-controlled dirigible wheels, at least one of said road wheel sets being vehicle traction wheels, each wheel set having left and right driver activated wheel brakes;

said means for computing braking forces comprising means for computing braking forces at each wheel when said vehicle wheel brakes are activated.

3. A method for effecting brake steering of an automotive vehicle for road use and having traction road wheels, driver-controlled dirigible road wheels, driver-activated road wheel brakes including driver-activated brake controls, means for controlling said dirigible wheels to effect a desired steering angle that results in a lateral position and means for detecting actual lateral position of said vehicle relative to said road designated by the driver;

said method including the steps of computing braking forces at each of said road wheels when said brakes are applied;

comparing actual lateral position to said designated lateral position determined by said steering angle to create a lateral position error signal;

activating said driver-activated wheel brakes in response to said error signal independently of said driver-activated brake controls;

computing yaw moment as a function of the difference in said braking forces;

computing rate of change of yaw and computing lateral vehicle acceleration required to change said actual lateral position of said vehicle including the step of computing cornering tire forces on said dirigible wheels as a function of the rate of change of yaw whereby braking forces are developed to effect steering intervention that complements driver steering of said driver-activated dirigible road wheels.

* * * * *